Sept. 29, 1925.  1,555,339
V. G. VAUGHAN
ELECTRIC AIR HEATER
Filed Aug. 18, 1923  2 Sheets-Sheet 1
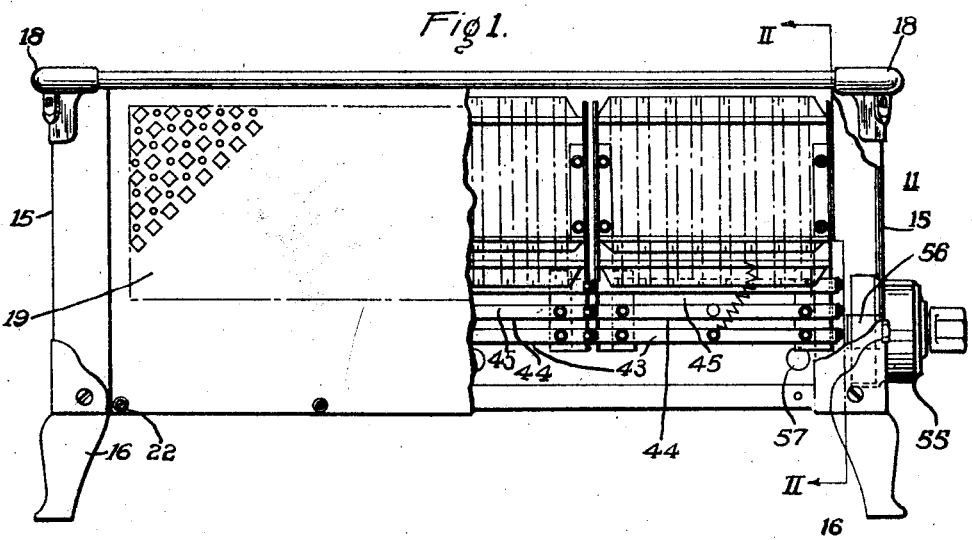
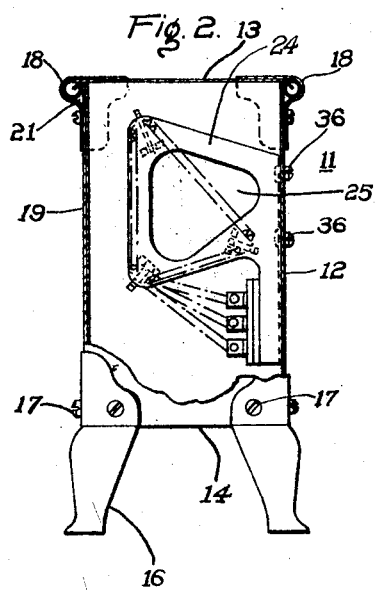
WITNESSES:
INVENTOR
Victor G. Vaughan
BY
ATTORNEY Sept. 29, 1925.
V. G. VAUGHAN
ELECTRIC AIR HEATER
Filed Aug. 18, 1923  2 Sheets-Sheet 2
1,555,339
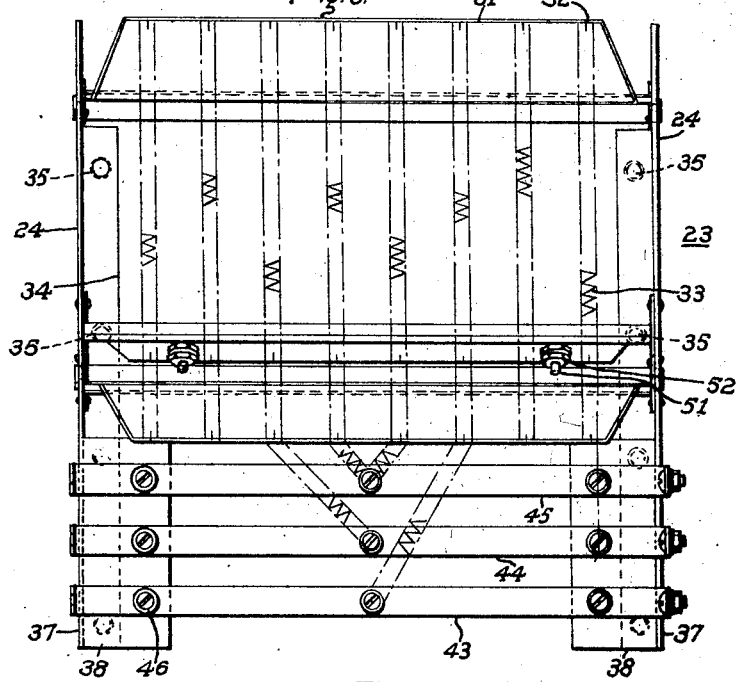
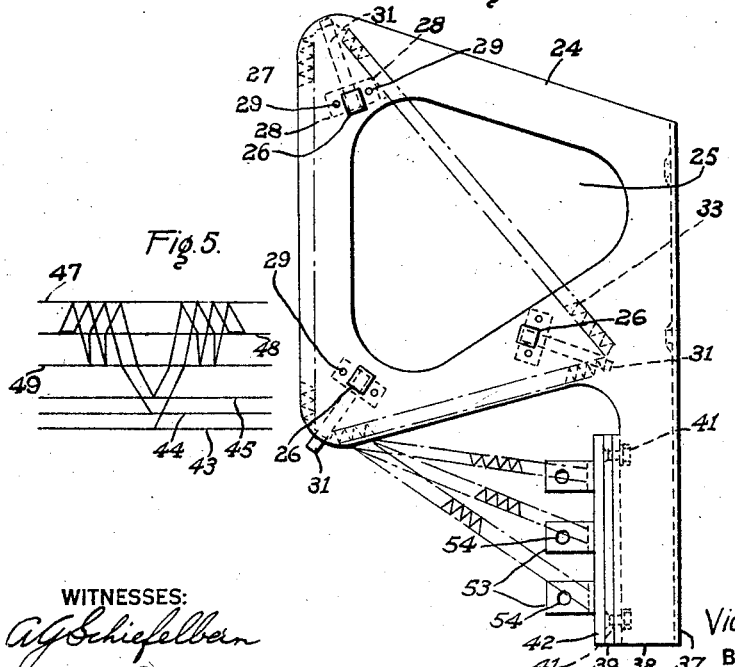
WITNESSES:
INVENTOR
Victor G. Vaughan
BY
ATTORNEY Patented Sept. 29, 1925.

1,555,339

UNITED STATES PATENT OFFICE.

VICTOR G. VAUGHAN, OF WILKINSBURG, PENNSYLVANIA, ASSIGNOR TO WESTINGHOUSE ELECTRIC & MANUFACTURING COMPANY, A CORPORATION OF PENNSYLVANIA.

ELECTRIC AIR HEATER.

Application filed August 18, 1923. Serial No. 658,012.

*To all whom it may concern:*

Be it known that I, VICTOR G. VAUGHAN, a citizen of the United States, and a resident of Wilkinsburg, in the county of Allegheny and State of Pennsylvania, have invented a new and useful Improvement in Electric Air Heaters, of which the following is a specification.

My invention relates to electric heating devices and particularly to electric air heaters.

One object of my invention is to provide a relatively simple and easily manufactured heating unit for an electric air heater.

Another object of my invention is to provide a relatively simple construction for an electric heating unit comprising a plurality of bus bars that serve also to hold the parts of the heating unit in their proper operative positions.

Another object of my invention is to provide a heating unit for an electric air heater that shall be easily and quickly mounted in and removed from its operative position in a casing.

Another object of my invention is to provide an electric heater that shall be readily accessible for connecting the ends of supply circuit conductors thereto.

In practicing my invention, I provide a casing having a plurality of perforated walls within which is located a plurality of independently removable electric heating units.

Each heating unit comprises a pair of spaced metal end frames substantially quadrilateral in contour. A plurality of metal members, of substantially channel form in lateral section, extend between the spaced end frames, to which their ends are secured. Bars of electric-insulating material have one edge located within said members of channel section and a helically wound resistor member is wound around the plurality of electric-insulating bars.

A plurality of bus bars are insulatedly mounted on integral portions of said end frames and serve to hold the end frames in their proper operative positions relatively to each other. Each of the bus bars is provided with laterally extending integral end portions that are perforated to permit of securing the adjacent ends of alined bars together to electrically connect them to each other.

In the drawings—

Figure 1 is a view, in front elevation with certain portions cut away, of an electric air heater embodying my invention, Fig. 2 is a view, in vertical lateral section therethrough, taken on the line II—II of Fig. 3, Fig. 3 is a view, in front elevation, of an individual heating unit, Fig. 4 is a view in end elevation thereof, and Fig. 5 is a schematic view of a resistor member and bus bars illustrating more particularly the method of winding the resistor and of connecting the ends thereof to the bus bars.

An electric air heater 11 comprises a casing that is built up of a plurality of sheet metal plates or panels. A plate 12 constitutes the rear wall, a plate 13 the top wall, a plate 14 the bottom wall and plates 15, the side walls. The respective plates are secured together at their abutting edges in any desired manner to form a rigid casing. A plurality of supporting members 16 are provided that may be secured to the casing 11 in any suitable or desired manner, here illustrated as by a plurality of machine screws 17.

Ornamental corner members 18 may also be provided at the upper corners of the casing and may be of any suitable or desired shape, co-operating with the casing 11 to give a pleasing and ornamental appearance thereto.

The top panel 13 is perforated as is also a removable front panel 19 that is inserted in its proper operative position by placing the upper edge thereof under a roll rim portion 21 of the top panel 12. The lower edge thereof is held by a plurality of machine screws 22.

Within the casing 11 there are located a plurality of independent heating units 23, each comprising a pair of spaced end frames 24, of relatively thin sheet metal, and substantially quadrilateral in contour. An intermediate portion of each of the end frames 24 is removed to provide an opening 25 to lighten the end frame and to reduce the amount of heat storage to a minimum value.

A plurality of relatively thin sheet metal members 26, bent to substantially channel form in lateral section, extend between the end frames 24, there being three members 26 in all that are located triangularly relatively to each other. An end portion 27 of the intermediate part of each of the members 26 extends through a suitable opening in the end frame 24 and is bent thereagainst. End portions 28 of the side parts of the members 26 are bent against the inner surface of the respective end frames 24 and are riveted thereagainst by rivets 29. An elongated, relatively thin, bar 31, of a suitable electric-insulating material such as asbestos lumber, has one of its edges located in the member 26 of channel section, and is provided with a plurality of spaced notches 32 adapted to have a portion of a helically-wound resistor member 33 located therein. The resistor member 33 is suitably wound around the three radially extending bars 31 in a manner to be hereinafter described in detail.

The rear portion of each of the members 21 is provided with an inturned integral flange 34 that is provided with a plurality of screw threaded openings 35 adjacent to the upper end thereof. When the end units 23 are mounted in their proper operative positions in the casing 11, the machine screws 36 extend through the rear panel 12 and into the openings 35 to securely hold the units in the casing.

Each of the end frames 24 is provided with an integral depending portion 37, having an inturned portion 38 integral therewith. A short flat plate 39 of a suitable electric-insulating material such as asbestos lumber, is secured against the flange 38 by flat-head machine screws 41. A second plate 42, of asbestos or other similar electric-insulating material, is located closely adjacent to the outer or front surface of the member 29. A plurality of bus bars 43, 44 and 45 extend between the two end frames 24 and are secured against the front surface of the respective plates 42 by short machine screws 46, extending therethrough and through the two plates 42 and 39.

As the three bus bars 43, 44 and 45 are located in parallel-spaced relation and have their ends firmly secured against the electric-insulating supports constituted by the plates 42 and 39, at each end of the unit, the bus bars serve to hold the two end frames and also the other parts of the heating unit securely and rigidly in their proper operative positions relatively to each other.

The resistor member 33 comprises two halves each of which is wound symmetrically around the three supporting members 41, from each end of the heating unit, substantially as illustrated in Fig. 5 of the drawing, in which the numeral 47 indicates the topmost supporting member 31, the numeral 48 indicates the rear member 31, as illustrated in Fig. 4, and the numeral 49 indicates the lower front member 31, in the same figure of the drawing.

Bolts 51 and nuts 52 are provided adjacent to each end of the rearmost bar (designated by the numeral 48 in Fig. 5) in order to firmly secure the intermediate portions of each of the two half portions of the resistor 33 thereagainst. Each half of the resistor is then wound circumferentially of the supporting members 31 in a double winding substantially as illustrated schematically in Fig. 5.

One end of the right hand half of the resistor member 33 is connected to the bus bar 43. The other end thereof is connected to the bus bar 45 to which is also connected one end of the left hand half of the resistor 33. The other end of the left hand half is connected to the bus bar 44.

With this winding, it is possible to connect the half portion either in series or in parallel to suitable sources of supply, or to connect one-half portion only to the said source of supply.

Each of the bus bars 43, 44 and 45 is provided with integral, laterally extending end portions 53 that are provided with openings 54 therethrough to permit of connecting them to similar and alined bus bars, as is more particularly shown in Fig. 1, wherein a plurality of such heating units are illustrated as mounted in side-by-side relation in a suitable casing 11.

A means for controlling the energization of the resistor members 33 comprises a suitable three-heat snap switch 55 that is located at one end of the casing 11, a metal strip 56 of substantially U-shape being provided within the casing 11 to hold the switch 55 in its proper operative position against the end panel 15.

An opening 57 is provided in the rear panel 12 adjacent to the switch 55, through which a conduit carrying supply circuit conductors (not shown) may extend into the casing. A terminal block (not shown) may be provided to which the bus bars, switch and supply circuit conductors may be suitably connected.

By removing the front panel 19, the necessary connections of the supply circuit conductors to the terminal block are easily and quickly made.

Any desired number of such heating units may be mounted in a suitable casing 11, it being understood, of course, that the length of the casing is in accordance with the number of heating units therein, although in case of necessity, a lesser number of such heating units may be installed. If it is desired, for instance, to install only the two end heating units in a casing built to contain three heating units, it is only necessary to provide an intermediate set of bus bars and to connect them substantially as shown in Fig. 1 of the drawing, to permit of suitably controlling the energization of the two heating elements.

The device embodying my invention thus provides a substantially self-contained and independent heating unit that may easily be mounted in, and removed from, the casing. Each unit has its component parts held in their proper operative position by the bus bars provided to conduct the current to and from the resistors thereof.

Various modifications and changes may be made herein, without departing from the spirit and scope of my invention, and I desire, therefore, that only such limitations shall be placed thereon as are imposed by the prior art or are specifically set forth in the appended claims.

I claim as my invention:

1. In an electrical heating device, in combination, a heating unit comprising a plurality of spaced end frames, a plurality of resistor-supporting members extending therebetween and supported thereby, a resistor member wound around said supporting members, and a plurality of bus bars secured to said end frames and serving also to hold said end frames in proper operative positions relatively to each other.

2. In an electrical heating device, in combination, a heating unit removable as a whole therefrom and comprising a pair of spaced end frames, a plurality of spaced, parallel-extending resistor-supporting members secured to said end frames, a resistor member wound on said supporting members and a plurality of bus bars secured to said end frames and adapted to hold them in their proper operative positions when said unit is removed from said device.

3. In an electrical heating device, in combination, a plurality of end frames, a plurality of spaced members, of substantially channel shape in lateral section, extending between said end frames and having their ends secured thereto, resistor-supporting bars located in said members of channel section, a resistor wound on said bars, and a plurality of bus bars having their ends secured to said end frames and serving also to hold them in proper operative positions relatively to each other.

4. In an electrical heating device, in combination, a casing comprising a plurality of metal wall panels, and a plurality of independently removable heating units located in side-by side relation in said casing, each heating unit comprising a pair of spaced end frames, a resistor member insulatedly mounted between said end frames and supported thereby and a plurality of bus bars having their ends insulatedly mounted on said end frames and serving also to hold said end frames in proper operative positions relatively to each other.

5. In an electrical heating device, in combination, a casing comprising a plurality of metal wall panels, and a plurality of independently removable heating units located in side-by-side relation in said casing, each heating unit comprising a pair of spaced end frames, a resistor member insulatedly mounted between said end frames and supported thereby, a plurality of bus bars having their ends insulatedly mounted on said end frames and serving also to hold said end frames in proper operative positions relatively to each other, and each having an angularly extending end portion for permitting of connecting the adjacent ends of alined bus bars together.

In testimony whereof I have hereunto subscribed my name this 13th day of August, 1923.

VICTOR G. VAUGHAN.